United States Patent [19]

Fritz et al.

[11] 3,882,197

[45] May 6, 1975

[54] ALPHA-OLEFIN COPOLYMER BLENDS

[75] Inventors: Andrea Fritz; Chi-Kai Shih, both of Wilmington, Del.

[73] Assignee: E. I. du Pont de Nemours & Company, Wilmington, Del.

[22] Filed: June 21, 1973

[21] Appl. No.: 372,050

[52] U.S. Cl. ...... 260/897 A; 260/876 B; 260/878 B
[51] Int. Cl. ............................................. C08f 37/18
[58] Field of Search ......... 260/876 B, 897 A, 878 B

[56] References Cited
UNITED STATES PATENTS

| | | | |
|---|---|---|---|
| 3,262,992 | 7/1966 | Holzer et al. | 260/876 |
| 3,354,239 | 11/1967 | Short | 260/876 |
| 3,478,128 | 11/1969 | Hagemeyer et al. | 260/876 |
| 3,632,674 | 1/1972 | Aishima et al. | 260/876 |

FOREIGN PATENTS OR APPLICATIONS 1,059,978  2/1967  United Kingdom............... 260/878

Primary Examiner—Murray Tillman
Assistant Examiner—C. J. Seccuro

[57] ABSTRACT

Blends of stereoregular propylene-alpha-olefin copolymers, polypropylene of similar stereoregularity and ethylene copolymer rubbers, characterized by melting and crystallization behavior characteristics of stereoregular propylene sequences as well as improved softness and injection molding characteristics.

6 Claims, No Drawings

ALPHA-OLEFIN COPOLYMER BLENDS

BACKGROUND OF THE INVENTION

Hydrocarbon copolymers having both thermoplastic and elastomeric properties have recently been discovered and are described in detail in the copending, coassigned (now abandoned) U.S. patent application of Fritz and Su, Ser. No. 281,942, hereby incorporated by reference. These polymers can be prepared by the simultaneous copolymerization of propylene and hexene-1 in the presence of a specific class of catalysts and cocatalysts. While these propylene-hexene-1 copolymers exhibit a good combination of physical properties, the method of copolymerization results in the formation of a random, statistical copolymer. The statistical arrangement of the monomers in the copolymer results in a relatively broad range of the melting point. This, in turn, presents difficulty in certain processing applications. For example, in injection molding the polymer, a high degree of orientation is imparted. This limits the adaptability and range of uses for the copolymer and, in combination with the low melting fractions of the copolymer composition, depreciates the long-term dimensional stability of injection-molded articles.

Various techniques can be used to alleviate these problems. For example, the random copolymer compositions can be purified to eliminate the low melting fractions. Alternatively, a block copolymer, as opposed to a random copolymer, can be prepared by alternating monomer feeds so as to carefully structure a copolymer. However, such procedures involves costly and burdensome process steps to achieve the desired results. Accordingly, a continuing industrial demand exists for a thermoplastic, elastomeric material which has improved processing and physical properties.

SUMMARY OF THE INVENTION

The present invention provides blends of polypropylene, propylene/higher alpha-olefin copolymers and ethylene copolymers that retain the desirable thermoplastic characteristics while reducing the deficiencies previously encountered.

Specifically, the instant invention provides intimate polymer blends comprising, by weight of the polymer blend, a. about from 5–90 percent of a random thermoplastic, elastomeric copolymer of propylene and at least one alpha-olefin having from 6–20 carbon atoms, the copolymer having stereoregular crystalline polypropylene sequences and amorphous sequences, about from 10–50 weight percent of the copolymer being derived from the alpha-olefin, the remainder being derived from propylene, the copolymer having a melt index of about from 0.01–200 g/10 min under a 2,160 g load at 190°C and a crystallinity number of about from 40–70; and b. about from 5–90 percent of polymer having at least one melting transition above 155°C and which consists essentially of substantially stereoregular polypropylene of the same type of stereoregularity as copolymer (a); and c. about from 5–80 percent of an uncured ethylene hydrocarbon copolymer rubber.

DETAILED DESCRIPTION OF THE INVENTION

The thermoplastic, elastomeric copolymers which form a basic component of the present copolymer blends are random statistical stereoregular copolymers of propylene and at least one higher alpha-olefin having from 6–20 carbon atoms. The copolymers exhibit certain crystallinity characteristics that result in their unique physical properties. A detailed description of the preparation of propylene/hexene-1 copolymers of this type is found in copending Fritz and Su application previously referred to. A detailed description of the preparation of copolymers of this type from propylene and higher alpha-olefins having from 7–20 carbon atoms is described in detail in the copending, coassigned (now abandoned) patent application of Fritz, Ser. No. 349,703 (LC-1666), also hereby incorporated by reference.

In addition to those copolymers specifically described in the copending applications, the polymer blends of the instant invention permit the use of propylene/higher alpha-olefin copolymers that have block characteristics. As used in connection with the thermoplastic, elastomeric copolymers used in the instant blends, the term "block" refers to a copolymer segment of propylene and a higher alpha-olefin of from 6–20 carbon atoms which is substantially random with respect to the arrangement of the propylene and higher alpha-olefin, and has a molecular weight of at least about 10,000, and differs in composition from adjacent polymer chain segments. Block propylene/higher alpha-olefins of this type can be prepared using the same processing techniques described in the aforementioned applications, but with alteration of the ratio of reactants in the course of the reaction. For example, removal of propylene after part of the copolymerization has occurred will leave the alpha-olefin which can homopolymerize until a fresh portion of propylene is added later; or greater and lesser proportions of the higher alpha-olefin can be introduced to vary the percentage composition of consecutive blocks of copolymer.

Polypropylene makes up 5–90 percent of the total weight of the copolymer blends of the present invention and preferably about from 10–80 percent. The polypropylene used in the present blends can vary widely in form. For example, substantially isotactic polyproplyene homopolymer can be used with isotactic propylene/alpha-olefin copolymer, or the polypropylene can be in the form of a copolymer containing up to about 15 weight percent of ethylene or up to about 10 percent of other monomer. Further, the polypropylene can be present in the form of a graft or block copolymer, in which the blocks of polypropylene have substantially the same stereo-regularity as the propylene-/alpha-olefin copolymer, so long as the block copolymer has a sharp melting point above about 155°C characteristic of the stereoregular propylene sequences.

Uncured ethylene hydrocarbon copolymer rubbers which can be used in the instant blends include copolymers of ethylene with at least one alpha-olefin of the formula $RCH_2$—$CH$=$CH_2$ (where R is hydrogen or $C_1$—$C_{15}$ alkyl). The copolymers can optionally include at least one nonconjugated diene such as acyclic dienes, e.g., 1,4-hexadiene; or bicyclic dienes, e.g., alkylidene norbornenes, alkenyl norbornenes, 5-alkyl-2,5-norbornadienes, and dicyclopentadiene.

Copolymers designated "EPM" and "EPDM" by ASTM D 1418-66 are preferred copolymers and include ethylene/propylene, ethylene/propylene/1,4-hexadiene; ethylene/propylene/5-methylene-2- norbornene; ethylene/propylene/5-ethylidene-2-norbornene; ethylene/propylene/dicyclopentadiene; and ethylene/propylene/1,4-hexadiene/2,5-norbornadiene copolymers. The ethylene content can beneficially be about from 20–75 percent by weight. The term "rubber" is used in its usual sense in the instant invention and refers to a material that is capable of recovering from large deformations quickly and forcibly and can be, or already is, modified to a state in which it is essentially insoluble (but can swell) in boiling solvent such as benzene, methyl ethyl ketone, and ethanol-toluene azeotrope. A rubber in its modified state, free of diluents, retracts within 1 minute to less than 1.5 times its original length after being stretched at room temperature (18°–29°C) to twice its length, and held for 1 minute before release.

The copolymer blends of the instant invention can be prepared by any procedure or order of addition that guarantees the intimate admixture of the components. Internal mixers are particularly useful for solution or melt blending. Blending at a temperature of about 180°C in a Brabender Plastograph for about 20 minutes has been found satisfactory. Another method that can be used for admixing the components involves blending the polymers in a Banbury internal mixer at about the flux temperature of the polypropylene, e.g., 180°C, for about 5 minutes. The complete admixture of the polymeric components is indicated by the merging of the crystallization and melting transitions characteristic of the polypropylene crystallinity of the components to give single crystallization and melting points for the blend.

The polymer blends of the instant invention exhibit a remarkable combination of desirable physical properties. The incorporation of as little as 5 percent each of polypropylene and ethylene hydrocarbon copolymer in the propylene/alpha-olefin copolymers increases the propylene sequence melting point or the polymer softening point but, more significantly, reduces the range to give a sharper melting point than that of the propylene/alpha-olefin copolymer. In addition, the incorporation of substantially isotactic polypropylene in accordance with the instant invention nearly eliminates the stickiness caused by a low-molecular-weight fraction of the propylene/alpha-olefin copolymer. Further, the crystallization characteristics of the copolymer blends are markedly improved over those of the propylene/alpha-olefin copolymers, the crystallization temperature of the propylene sequences being raised. This permits their satisfactory use in injection molding operations without the orientation previously encountered. Injection-molded articles prepared from the instant copolymer blends accordingly exhibit excellent long-term dimensional stability. The presence of the ethylene copolymer in the blend can significantly lower Shore A hardness over that of propylene/alpha-olefin copolymers or mixtures thereof with polypropylene. In addition to obtaining a lower hardness range, compositions of the present invention exhibit lower brittle points than propylene/alpha-olefin copolymers or blends with polypropylene alone in those situations where the glass transition temperature of the ethylene hydrocarbon copolymer is below that of the propylene/alpha-olefin in the blend. These advantages are are obtained without the need for elaborate purification of the propylene/alpha-olefin copolymer or the tedious preparation of a carefully structured block copolymer.

A further benefit of the instant invention involves the improvement of the present three-component blends over blends of polypropylene and an EPDM rubber. These two-component blends generally exhibit an undesirable whitening when bent, frequently referred to as "blushing." It has been found that blushing is surprisingly eliminated in the polymer blends of the present invention for many of the blend compositions, including, for example, a blend in which the three components are present in about equal proportions, blends in which the polypropylene component is less than about one-third of the blend, and blends in which the polypropylene component comprises up to about one-half of the blend but is present as a copolymer of propylene and minor quantities of ethylene, e.g., 5 weight percent or lower.

The mechanism by which the desirable characteristics of the present copolymer blends are obtained is not fully understood. However, it is believed to involve a cocrystallization phenomenon between propylene sequences of similar stereoregularity in the various polymeric components, which results in a single crystallization temperature and a single melting temperature of the copolymer blend which is generally higher than those of the propylene/alpha-olefin component of the blend. It is surprising that the blend has a single crystallization temperature and a single melting temperature, since it would be expected by those skilled in the art that the blending of two crystalline polymers would result in a double crystallization temperature as well as a double melting temperature reflecting the two polymeric components. However, the intimate blending of the polymers having the required crystallinity characteristics apparently results in a crystallization phenomenon that modifies the other physical properties of the propylene/alpha-olefin copolymer, thus measurably increasing its commercial utility and range of applications.

The polymer blends within the scope of the present invention can be modified to adjust the characteristics of the blend as desired. In a preferred embodiment of the invention, the thermoplastic, elastomeric copolymer comprises about from 10–70 weight percent of the blend, the polypropylene component comprises about from 10–80 weight percent, and the uncured rubber comprises about from 5–75 weight percent. For those blends having high thermoplastic elastomer content, for example, up to 90 weight percent, the blend is characteristic of those copolymers, but with lower glass transition temperatures and greater softness than the copolymer itself. For those blends having a high polypropylene content, for example, approaching 90 percent, the copolymer blend can be characterized as an impact modified polypropylene. Those blends containing a high proportion of uncured ethylene copolymer rubber, for example, approaching 80 percent, can be characterized as a very soft thermoplastic elastomer.

As will be evident to those skilled in the art, the present polymer blends can also include fillers, plasticizers and other additives normally used in conjunction with elastomeric compositions.

The invention is further illustrated by the following specific examples.

In the Examples, the melting point and crystallization temperature are determined by first heating a 10–20 mg sample, in a crimped aluminum pan, to 200°C and in a differential scanning colorimeter. After being held at 200°C for 3 minutes, the sample is cooled at the rate of 20°C/minute, and the crystallization temperature is observed as the onset of the exotherm. After cooling to 25°C, the sample is heated at the rate of 10°C/min., and the melting point is observed as the minimum temperature of the endotherm.

EXAMPLES 1–4

A random, statistical, isotactic, thermoplastic, elastomeric copolymer of propylene and 1-hexene is made by a continuous slurry process using a gamma-TiCl$_3$ catalyst. The reactor has a 30-liter volume and is operated at 50°C and 4.9 kg/sq cm (70 psi) with a residence time of 46.9 minutes. The following flow rates are used:

| | | |
|---|---|---|
| Hexane | 435 ml/min | |
| Propylene | 26,840 cm³/min | 46.2 g/min |
| 1-Hexene | 100 cm³/min | 67.0 g/min |
| Hydrogen | 125 cm³/min | |
| Et$_2$AlCl | 0.003 mol/min | |
| (TiCl$_3$)$_3$·AlCl$_3$ | 0.0008 mol/min | |

These flow rates give the following conditions:

| | |
|---|---|
| Propylene:hexene mol ratio | 1.38:1 |
| DEAC:TiCl$_3$ mol ratio | 3.75:1 |
| Weight percent solids | 4.39 |
| Hexane mol fraction | 0.637 |
| Propylene mol fraction | 0.210 |
| 1-Hexene mol fraction | 0.152 |
| Hydrogen mol fraction | 0.001 |

Propylene/1-hexene copolymer is formed as a slurry at the rate of 20 g/min. It has 36 weight percent 1-hexene monomer units and is characterized by a melt index of 3.6 g/10 min (at 190°C under a 2160-gram load; Method D 1238-65T, Condition E) and a crystallinity index of 43.

A blend is prepared by mixing 65 parts of EPDM rubber and 35 parts of isotactic polypropylene ("Amoco" 4018) in a Banbury internal mixer at 180°C for 15 minutes The EPDM rubber used has the following monomer unit composition by weight: Ethylene, 68 percent; propylene, 26 percent (total); 1,4-hexadiene, 5.8 percent; 2,5-norbornadiene .02 percent. Its inherent viscosity (measured at 30°C on a solution of 0.1 g of copolymer in 100 ml of tetrachloroethylene) is about 1.15 deciliters/gram. Its Mooney viscosity (ML-1 + 4/121°C) is about 25.

Three-component blends are prepared by mixing the propylene/hexene copolymer previously prepared with the EPDM-polypropylene blend in a Brabender Plastograph internal mixer for 15 minutes at 180°C. Table I gives the proportions employed in the several Examples and typical DSC values for melting and crystallization transitions.

TABLE I

| | Composition of 3-Component Blend | | | | | |
|---|---|---|---|---|---|---|
| Example | (a) % P/H | (b) %PP | % EPDM | %PP in (a)+(b) | Tm(°C) | Tc(°C) |
| Control | 0 | 35 | 65 | 100 | 50$^e$, 164 | 115 |
| 1 | 5 | 33.2 | 61.8 | 87 | 45$^e$, 158 | 107 |
| 2 | 10 | 31.5 | 58.5 | 76 | 45$^e$, 157 | 104 |
| 3 | 15 | 29.8 | 55.2 | 66.5 | 43$^e$, 157 | 103 |
| 4 | 25 | 26.2 | 48.8 | 51 | 45$^e$, 158 | 109 |
| Control | 0 | 100 | 0 | 100 | 166 | 122 |
| Control | 100 | 0 | 0 | 0 | 148 | 86 | e = ethylenic crystallinity
Tm = melting transition temperature
Tc = crystallization transition temperature

EXAMPLES 5–7

In Examples 5–7, three-component blends are prepared according to the same general procedure as used in Examples 1–4. The EPDM rubber is first admixed with isotactic polypropylene in a ratio of 65–35. Varying quantities of this two-component blend are then admixed with propylene/hexene copolymer to give three-component blends of the invention.

The physical properties of these blends are tested, together with controls comprising 100 percent propylene/hexene copolymer and 100 percent of the EPDM rubbers/polypropylene blend. The stress-strain characteristics at 25°C are measured on an Instron tester. The modulus at 100, 200, and 300 percent extension, together with the tensile strength at break, extension at break, and other physical characteristics are summarized in Table II.

TABLE II

| Example | Control | 5 | 6 | 7 | Control |
|---|---|---|---|---|---|
| % P/H in Blend* | 0 | 15 | 25 | 33 | 100 |
| S/S at 25°C.** | | | | | |
| M100 (kg/sq. cm.) | 77.4 | 75.9 | 67.5 | 68.9 | 52.7 |
| M200 (kg/sq. cm.) | — | 78.7 | 73.1 | 73.1 | 54.8 |
| M300 (kg/sq. cm.) | — | 84.4 | 77.3 | 77.3 | 91.4 |
| T$_B$ (kg/sq. cm.) | 77.4 | 98.4 | 127 | 120 | 183 |
| E$_B$ (%) | 100 | 510 | 620 | 550 | 530 |
| Shore D hardness | nd | 39 | 39 | 39 | 40 |
| Bashore resilience | nd | 40 | 36 | 33 | 28 |
| Tg (°C) | −40 | nd | nd | nd | −29 |

*Remainder is 65:35 EPDM:polypropylene mixture
**ASTM D 412 at 20 in/min
M100 = tensile stress at 100% elongation
M200 = tensile stress at 200% elongation
M300 = tensile stress at 300% elongation
T$_B$ = tensile stress at break
E$_B$ = % elongation at break (tensile strain at break)

EXAMPLES 8-11

Intimate blends of the polymers used in Examples 1-4 are prepared by simultaneously adding all components to a Brabender Plastograph internal mixer and mixing at 180°C for 15 minutes. The physical properties of the resulting blends are observed and summarized in Table III, together with control test of pure propylene/hexene copolymer and isotactic polypropylene.

TABLE III

| Example | Control | 8 | 9 | 10 | 11 | Control |
|---|---|---|---|---|---|---|
| % P/H | 100 | 33⅓ | 33⅓ | 33⅓ | 25 | 0 |
| % PP | 0 | 25 | 33⅓ | 41⅔ | 33⅓ | 100 |
| % EPDM | 0 | 41⅔ | 33⅓ | 25 | 41⅔ | 0 |
| Tg (°C.) | −29 | −43 | −43 | −43 | −43 | 0 |
| m.p. (°C.) | 148 | nd | 162 | 158 | nd | 166 |
| Shore D hardness | 40 | nd | 44 | 54 | 71 | 72–75 |
| Bashore resilience | 28 | 36 | 34 | 38 | 46 | nd |
| Compression Set* | 44 | 87 | 74 | 81 | 85 | nd |
| S/S at 25°C.** | | | | | | |
| M100 (kg/sq. cm.) | 52.7 | 77.4 | 77.4 | 105 | — | — |
| M200 (kg/sq. cm.) | 54.8 | 80.9 | 84.4 | 109 | — | — |
| M300 (kg/sq. cm.) | 91.4 | 87.9 | 91.4 | 109 | — | — |
| $T_R$ (kg/sq. cm.) | 183 | 123 | 144 | 193 | 316 | 77.4 |
| $E_R$ (%) | 530 | 520 | 660 | 600 | 50 | 40 |

*After 22 hrs. at 70°C.; measured at 25°C.
**ASTM D-412 at 20 in/min

EXAMPLE 12

A continuous 30.2-liter reactor is operated at 50°C and a pressure of 4.92 kg sq cm with a residence time of 50 minutes. The following flow rates are established at steady-state:

| | Per Minute | |
|---|---|---|
| Propylene | 1.1 | moles |
| Hexene | 0.8 | mole |
| Hydrogen | 125 | cc |
| $(TiCl_3)_3 \cdot AlCl_3$ | 0.8 | milli mole |
| Diethyl AlCl | 3 | milli moles |
| Hexane | 435 | cc |

Propylene/hexene copolymer is formed continuously and is recovered from the effluent at the rate of 20 g/min. The product is isolated by deactivating the catalyst with isopropanol, treating the copolymer with HCl and isopropanol, and drying the washed copolymer in a vacuum oven. The isolated product has 36 wt. percent hexene, its melt index is 6.0 g/10 min (at 190°C under a 2160-gram load; ASTM Method D 1238-65T, Condition E), and its crystallinity number is 44.

The resulting random elastomeric, thermoplastic propylene/hexene copolymer is mixed in 1:1:1 weight proportions with isotactic polypropylene and a branched ethylene/propylene/1,4-hexadiene/2,5-norbornadiene tetrapolymer made in accordance with the general procedures of Canadian Pat. No. 855,774 to Campbell and Thurn. This tetrapolymer has the following monomer unit composition: Ethylene, 72.75 percent; propylene, 23 percent; 1,4-hexadiene, 4.1 percent; 2,5-norbornadiene, 0.15 percent. The tetrapolymer has an inherent viscosity of 1.25 at 30°C (measured on a solution of 0.1 g of tetrapolymer in 100 ml of tetrachloroethylene) and a Mooney viscosity of 19 (ML-1 + 4/121°C). A Brabender Plastograph is employed having a small electrically heated chamber with two convoluted rollers capable of shear-mixing and masticating polymer at a selected high temperature. The plastograph is operated at 75 rpm and 180°C to mix the components; after 10 minutes mixing, the machine is opened, cooled for 1 minute, and unloaded. The compositions of the resulting intimate blends are given in Table IV.

Flexural modulus bars 12.7 × 3.175 × 127.0 mm (½ × ⅛ × 5 inches) and 12.7 × 1.58 × 127.0 mm (½ × 1/16 × 5 inches) are formed by injection molding. In each case, a sample of a blend is put in a piston-operated 28.3-gram injection-molding machine having a reservoir at 190°C; and is injected under a pressure reaching a maximum of 14.1 kg/sq cm over a 20-second period into a mold and held for an additional 20 seconds. The mold is set at 40°C.

The ½inch-thick bars made from the intimate blends of this invention display no strain pattern when inspected for orientation between two crossed polarizers; in contrast, the propylene/hexene copolymer itself displays a noticeable strain pattern.

TABLE IV

| | ORIENTATION | |
|---|---|---|
| | ⅛" Thick | 1/16" Thick |
| P/H | Yes | Yes |
| P/H + PP + EPDM | No | Slight |
| PP + EPDM (1:1) | No | No |
| PP | No | No |

The strain pattern of the 1/16inch-thick propylene/hexene copolymer bar is again noticeable, but that of the blend displays a reduced intensity proportional to the polypropylene content in the blend.

We claim:

1. An intimate polymer blend comprising, by weight of the blend, a. about from 5–90 percent of a thermoplastic, elastomeric copolymer of propylene and at least one alpha-olefin having from 6–20 carbon atoms, the copolymer having stereoregular crystalline sequences and amorphous sequences, about from 10–50 wt. percent of the copolymer being derived from the alpha-olefin, the remainder being derived from propylene, the copolymer having a melt index of about from 0.01–200 at 190°C and a crystallinity number of about from 40–70;

b. about from 5–90 percent of polymer having at least one melting transition above 155°C and which consists essentially of substantially stereoregular polypropylene of the same type of stereoregularity as copolymer (a); and c. about from 5-80 percent of an uncured ethylene hydrocarbon copolymer rubber which is a copolymer of ethylene, at least one alpha-olefin of the formula $RCH_2-CH=CH_2$ wherein R is hydrogen or $C_1-C_{15}$ alkyl, and optionally at least one nonconjugated diene.

2. A polymer blend of claim 1 wherein the alphaolefin in the thermoplastic, elastomeric copolymer consists essentially of hexene-1.

3. A polymer blend of claim 1 wherein the alphaolefin in the thermoplastic, elastomeric copolymer consists essentially of dodecene.

4. A polymer blend of claim 1 wherein component (b) consists essentially of substantially isotactic propylene homopolymer.

5. A polymer blend of claim 1 wherein element (a) comprises about from 10-70 wt. percent; element (b) comprises about from 10-80 wt. percent; and element (c) comprises about from 5-75 wt. percent of the blend.

6. A polymer blend of claim 1 wherein components (a), (b), and (c) are present in substantially equal weight proportions.

* * * * *